June 26, 1945.   W. R. HARDING ET AL   2,379,150
SERIES VARIABLE VOLTAGE EQUIPMENT
Filed Nov. 11, 1941    2 Sheets-Sheet 1

WITNESSES
Wm B Sellers.

INVENTORS
William R. Harding and
Scott H. Hanville, Jr.
BY
Paul E. Friedmann
ATTORNEY June 26, 1945.  W. R. HARDING ET AL  2,379,150
SERIES VARIABLE VOLTAGE EQUIPMENT
Filed Nov. 11, 1941   2 Sheets-Sheet 2

WITNESSES:  
Wm. B. Sellers.

INVENTORS  
William R. Harding and  
Scott H. Hanville, Jr.  
BY  
Paul E. Friedemann  
ATTORNEY Patented June 26, 1945

2,379,150

UNITED STATES PATENT OFFICE 2,379,150

SERIES VARIABLE VOLTAGE EQUIPMENT

William R. Harding, Murrysville, Pa., and Scott H. Hanville, Jr., Huron, Ohio, assignors to Westinghouse Electric Corporation, East Pittsburgh, Pa., a corporation of Pennsylvania Application November 11, 1941, Serial No. 418,631

8 Claims. (Cl. 172—239)

Our invention relates to adjustable speed drives, and more particularly to a variable voltage generator and motor drive in which the generator is a series generator without a separately or shunt excited field winding, and the motor is also of the series type having substantially the same frame size, though not necessarily so, as the generator, and thus having a rating substantially equal to that of the generator.

Our present invention includes improvements over our invention disclosed and claimed in our copending application entitled "Series speed control units," filed on October 19, 1940, Serial No. 361,934.

Series motors, of course, are in regular use and well known to the trade, but series generators for operating motors have always been held very unsatisfactory. For instance, as one of their disadvantages, such generators have a rising voltage characteristic with an increase in load current. This is usually very unsatisfactory. However, by selecting the proper values of the constants of both the generator and the motor, the motor speed may be kept substantially constant for any speed setting selected regardless of the variations in load.

One object of our invention is to obtain low motor speeds down to zero speeds in a series drive of the type we disclose.

Another object of our invention is to provide for a voltage control of a series generator wherein the motor speed changes will be more nearly proportional to the field rheostat settings.

It is also an object of our invention to obtain a fine voltage control of a series generator by the use of a single vernier rheostat in conjunction with a scheme of connection that makes the rheostatic field control more nearly proportional to the voltage changes effected.

The objects expressly stated are merely illustrative of many other objects that will become apparent from a study of the following specification when taken in conjunction with the drawings, in which.

Figure 1:
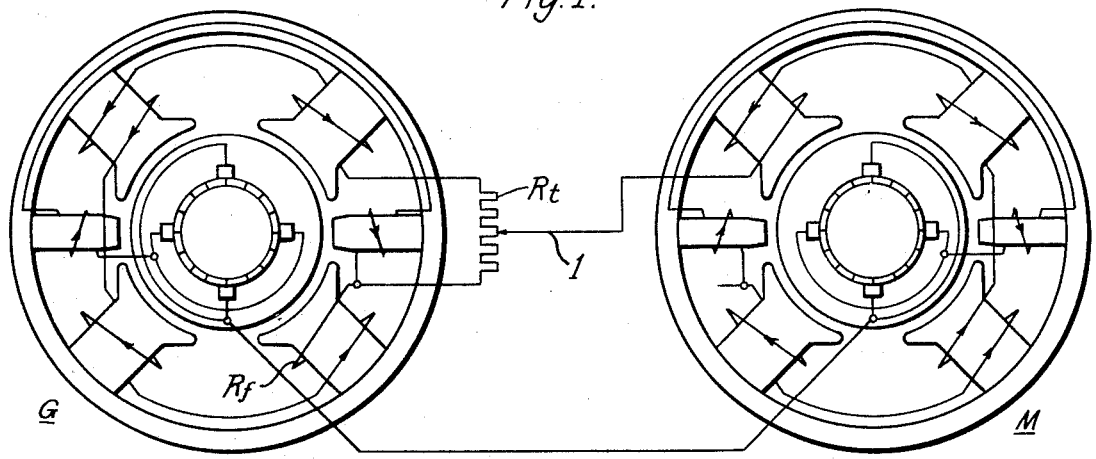
Figure 1 is a diagrammatic showing of a series drive utilizing our special rheostatic control.
Figure 3:
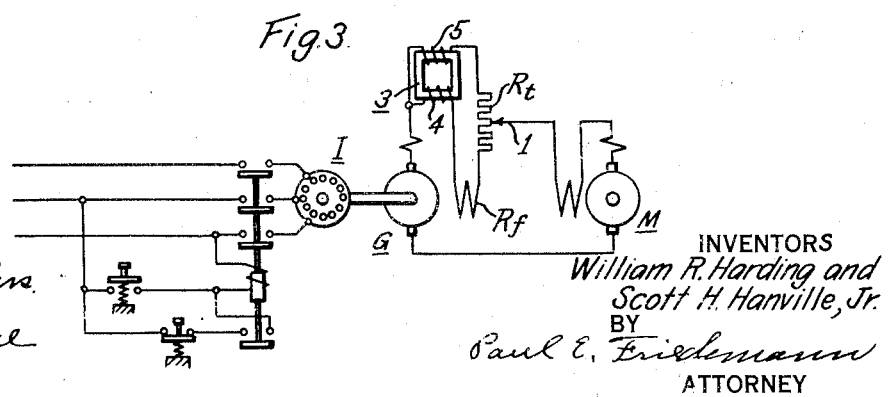
Fig. 3 is a simplified diagrammatic showing of our invention.

In Figure 1, G represents the series generator driven at a constant speed by any suitable means, as constant speed motor I shown in Fig. 3. The series motor M is connected in a loop circuit with the generator and is coupled to drive a load (not shown). Both the generator and the motor are designed or treated, as by annealing, so as to have lower residual than normal with reference to the no-load saturation flux of the machine. Residual magnetism in units which give satisfactory results ranges from, two to four percent of the no-load saturated value and up to nearly twenty percent of the no load saturated value, twenty percent being considered substantially normal.

The generator and the motor (Figs. 1 and 2) are further each provided with interpoles or commutating poles having a high magnetic capacity so that the pole pieces for the interpoles do not readily become saturated. Since the generator is selected to have a low residual magnetism, the burden of maintaining its voltage at low motor speeds falls more and more on the generator series field windings. Since the voltage is necessarily low at low speeds, the armature reaction distorts or shifts the current sheet so much that the generator cannot maintain its voltage. By the term current sheet is meant the effective region on the surface of the brushes of a machine at which it may be considered that the entire current flow is concentrated.

To control the speed of motor M, the field current is controlled in series field $R_f$ by means of a resistor $R_t$ connected in a loop circuit with the series field. The current in the field is adjusted by means of a contact lead I constituting a direct portion of the loop circuit including the motor and the generator. With our present scheme, all of the resistor is always used, but the resistance relation of the two parallel circuits disposed between the connection of the lead I and resistor and the field is changed. This will become clearer from the more detailed description given hereinafter.

Figure 2:
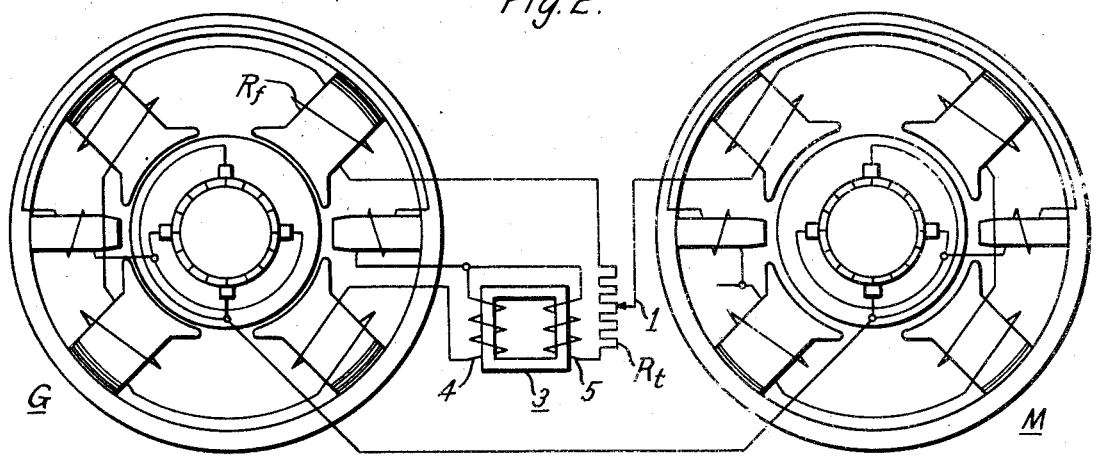
Fig. 2 is a diagrammatic showing of a more comprehensive combination of our invention.

In Fig. 2, the rheostatic control is the same, but is shown in combination with a reactor 3 as shown and with dynamo-electric machines so designed as to have low residual for the generator and still lower residual for the motor. Note that the air-gap of the motor is greater than that of the generator.

In this present scheme, the two coils 4 and 5 of the reactor may have the same number of turns as shown in Fig. 3 or may have a different number of turns of the same size wires as shown in Fig. 2. The coil 5 may have the greater number of turns so that the reactance of coil 5 may be near the combined reactance of coil 4 and field Rf.

The reactor 3 is in effect a transformer having a ratio selected to give the most correction at the operating point when the correction is most needed. This point, for example, may be at high load and low speed of the motor. This reactor or transformer is connected with the primary winding 5 in series with the rheostatic control and with its secondary winding 4 connected in series with the line, or more specifically, the generator series field RF. The series connected rheostat and primary winding 5 are in turn connected across the secondary winding 4 and generator series field winding RF. The polarities of this circuit arrangement are such that any increase in the line current due, say, to an increasing load on the motor, tends also to increase the rheostat current and vice versa. Hence, the rheostat current follows closely the fluxations of live or field current. With a sudden increase in current with the reactor or transformer connected as shown the generator voltage is increased to increase the generator field current. If the reactor were not in the circuit and the rheostat alone shunted the generator series field, a large proportion of the line current, because of the inductance of the generator series field, would be shunted through the rheostat thus causing an immediate drop in generator speed. The reactor, because of its inductance, also has a tendency to prevent any undesirable circulating currents from occurring.

Figure 5:
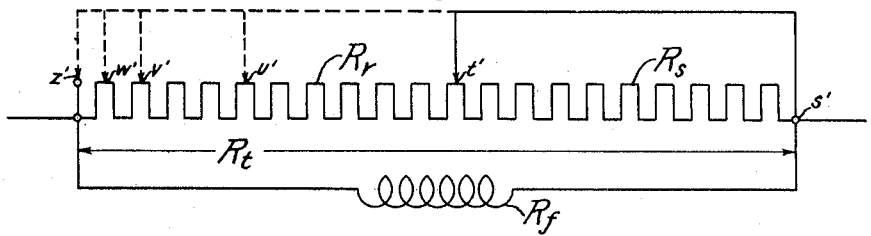
Fig. 5 is a more detailed, but simple, showing of our prior methods of control.

For Fig. 5 let $R_t$ = total rheostat resistance;
$R_f$ = total field resistance;
$R_s$ = resistance of that portion of the rheostat to the right of the position of the adjustable lead contacting with the rheostat at point $t'$;
$I_f$ = the current in the series field; and
$I_r$ = the current in the portion $R_r$ of the rheostat to the left of point $t'$.

From Fig. 5 it follows that (1)
$$\frac{I_f}{I_r} = \frac{R_r}{R_f}$$

Disregarding windage, which is a negligible loss, and assuming a friction load, which is a usual application for series drives of this type, then I, the total current, is a constant and by keeping the motor fully loaded I = a constant which can be equal to unity.

(2) That is, $I_r + I_f = 1$, for the operations specified. For the case shown in Fig. 5, $R_s$ does not enter in the relationship since $R_s$ is the portion of the rheostat that is shunted.

Figure 6:
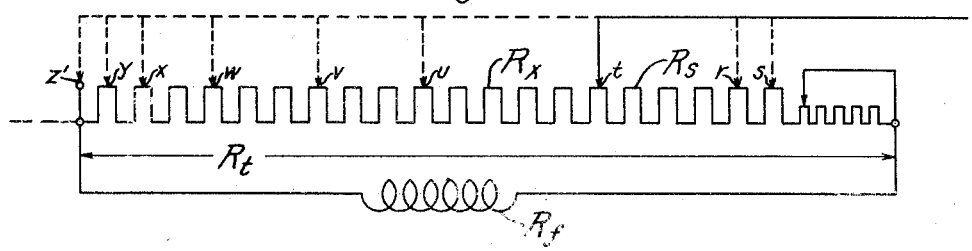
Fig. 6 is a more detailed, but simple, showing of our present method of control.

For the showing in Fig. 6, let $R_x$ = the portion of the rheostat to the left of point $t$,
$I_x$ = the current in the rheostat portion $R_x$
$I_{f1}$ = the current in the series field.

For the showing in Fig. 6, namely, for one of the contributions made by this invention of ours, the following is true:

(3)
$$\frac{I_{f1}}{I_x} = \frac{R_x}{R_f + R_s}$$

It is manifestly possible to always pick a point on the rheostat in Fig. 6, as point $t$ in Fig. 6 and a point on the rheostat, in Fig. 5, as point $t'$, such that $I_x = I_r$. It, therefore, follows from (2) that (4) $\quad I_f = I_{f1}$ at such points.

(5) Therefore, from (1) and (3), $$\frac{R_r}{R_f} = \frac{R_x}{R_f + R_s}$$

at such points.

(6) Since $R_x = R_t - R_s$ it follows
(7) That $$\frac{R_r}{R_f} = \frac{R_t - R_s}{R_f + R_s}$$

Figure 4:
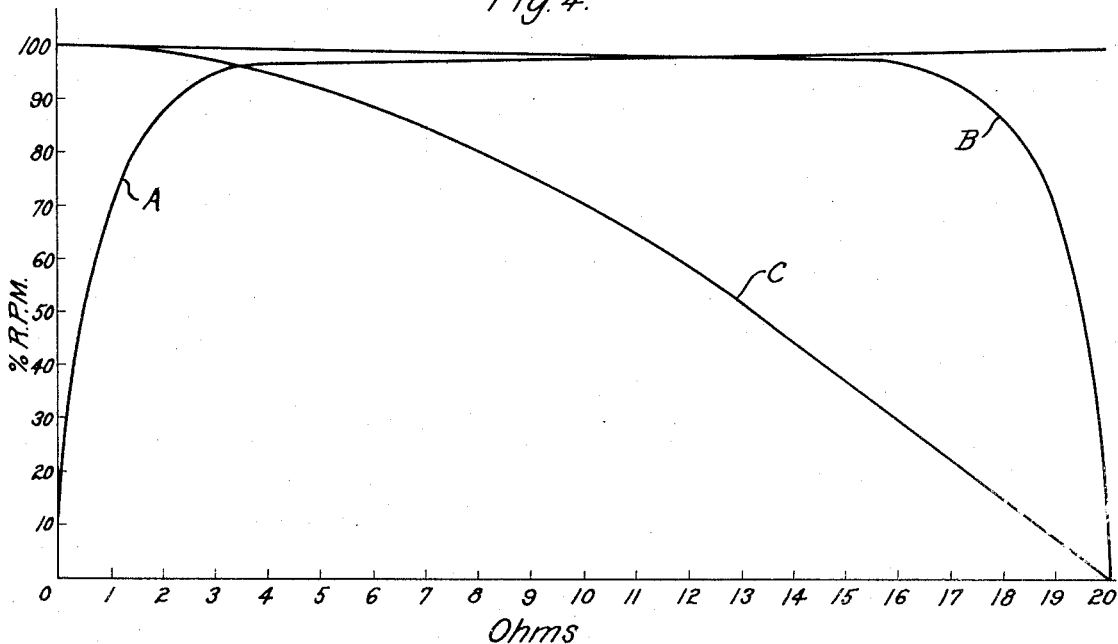
Fig. 4 shows curves helpful in explaining our contribution to the art.

The curve A shown in Fig. 4 is a curve accurately determined from tests and empirical data and shows percent motor speed plotted against the ratio, $$\frac{R_r}{R_f}$$

For instance at 87% of full speed $$\frac{R_r}{R_f} = 1.9$$

at 80%

$$\frac{R_r}{R_f} = 1.4$$

at 70%

$$\frac{R_r}{R_f} = .925$$

and so on.

An actual practical value of generator series field resistance, $R_f$ may be taken as .09 ohm, but may be more or less depending on the machine used. To simplify the consideration, $R_f$ may be taken as unity. Further, we have found good speed control can be had over a sufficiently wide range when the rheostat resistance is chosen as twenty times that of the field resistance, that is, $R_t = 20 R_f$.

For the value of $R_f$ selected as unity, $R_t = 20 \times 1 = 20$.

Substituting in Equation (7) the values of $$\frac{R_r}{R_f}$$

from the curve A and the value of $R_t$ and solving for $R_s$, we obtain the curve C, the ratio of $R_s$ to $R_f$, for Fig. 6, plotted against percent speed.

Since curve C is a much straighter line than curve B, the ratio of $R_s$ to $R_f$ for Fig. 5, it follows that the rheostat arm for effecting equal changes in speed for the arrangement shown in Fig. 5 has to be shifted to positions $t'$, $u'$, $v'$ and $w'$, which may represent 80%, 70%, 45% and 35% of full speed. It is thus apparent that for rheostats using readily available resistor sections representing a certain minimum resistance per section no speeds lower than 35% of full speed can be obtained. A very special research laboratory type of rheostat would have to be used between point $w'$ and $z'$ to obtain any speeds lower than, say, 35% of full speed.

With our arrangement as shown in Fig. 6, the rheostat arm, to effect equal changes in speed, may be shifted, respectively, to positions $t$, $u$, $v$, $w$, $x$, and $y$, which may represent, say 80%, 70%, 45%, 35%, 20% and 10% of full speed.

With the scheme shown in Fig. 5, a vernier rheostat cannot be readily used to obtain intermediate speeds, because a vernier designed to take care of the speed range between points $s'$ and $t'$ would be of no use for any other range. Similarly, a vernier rheostat designed for the speed range between $t'$ and $u'$ would be of no use for any other range, as many vernier rheostats would have to be used as there are major steps.

With our scheme of speed control for a series drive, one vernier of readily commercially available type will suffice because the steps between successive speed positions are nearly equal. For instance, if the s position in Fig. 6 represents 98% of full speed, then by shifting the arm on the vernier rheostat to the right the speed may be decreased in successive steps, say, to 95% of full speed. For each main step in the speed control, intermediate speeds may thus be obtained with the vernier. Not only do we thus provide a control whereby the rheostat can be used to obtain the low motor speeds, but we obtain a much finer selection of speeds by the combination of a vernier rheostat and the type of main rheostatic control shown. The rheostats can even be used to obtain zero speed and a fine gradation of low speeds right down to zero speed.

Our invention is not to be limited to the exact circuits shown, but is to be limited only by the scope of the claims hereto appended.

We claim as our invention:

1. In a series drive, in combination, a series generator, having an armature winding, a series field winding; a series motor having an armature winding and a series field winding; a commutating field winding having a magnetic circuit of a magnetic capacity sufficiently high so that high currents traversing the commutating field winding do not saturate the commutating poles whereby the armature reaction at high armature currents does not shift the current sheet; a resistor, a first loop circuit including the generator series field winding and said resistor; a second loop circuit including the generator armature, one terminal of the generator armature winding, the commutating field winding, a lead from the commutating field winding to the first loop circuit at the junction of the generator series field and said resistor, an adjustable lead connected at any selected point on the said resistor, the motor series field winding, the motor armature winding, and a lead back to the other generator armature terminal; and means for driving the generator at substantially constant speed.

2. In a series drive, in combination, a series generator, having an armature winding, a series field winding; a series motor having an armature winding and a series field winding; a resistor, a reactor having two coils; a loop circuit including a first junction, one coil of the reactor, the generator series field winding, a second junction, said resistor, and the second coil of the reactor back to the first junction; a second loop circuit including a connection from the first junction to the generator armature winding, the generator armature winding, the motor armature winding, the motor series field winding, and a shiftable lead connecting to any selected point on the resistor, and both portions of the first loop circuit, between said point and the first junction; and means for driving the generator at constant speed.

3. In a series drive, in combination, a series generator, having an armature winding, a series field winding, a series motor having an armature winding and a series field winding; a commutating field winding having a magnetic circuit of a magnetic capacity sufficiently high so that high currents traversing the commutating field winding do not saturate the commutating poles whereby the armature reaction at high armature currents does not shift the current sheet; a resistor, a reactor having two coils; a loop circuit including a first junction, one coil of the reactor, the generator series field winding, a second junction, said resistor, and the second coil of the reactor back to the first junction; a second loop circuit including a connection from the first junction to the generator armature winding, the generator armature winding, the motor armature winding, the motor series field winding, and a shiftable lead connecting to any selected point on the resistor, and both portions of the first loop circuit between said point and the first junction, and the commutating winding; and means for driving the generator at constant speed.

4. In a series drive, in combination, a series generator; a series motor; a resistor for adjusting the excitation of the series field winding; a reactor having two coils; said generator and motor being connected in a loop circuit including the generator armature, the motor armature, the motor series field winding, an adjustable connection from the motor field winding to connect at any point on the resistor, a parallel circuit including in one leg any selected portion of the resistor, the generator series field winding, one coil of the reactor and including in the other leg the portion of the resistor not selected, and the other coil of the reactor, back to the generator armature winding; and means for driving the generator at substantially constant speed.

5. In a series drive, in combination, a series generator having an armature winding, a series field winding, and a magnetic circuit for the series field winding having a residual flux of not more than ten percent of the no-load saturation flux of the generator; a series motor having an armature winding and a series field winding and a magnetic circuit having a residual flux of not more than ten percent of the no-load saturation flux of the motor; a resistor comprising two groups of sections with a plurality of sections in each group, an adjustable lead connected to one junction of the resistor and disposed to shunt any number of sections of one group of sections of the resistor, said generator series field winding being connected in series circuit with said resistor to thus form a first loop circuit; a second loop circuit, said second loop circuit including the generator armature winding, the motor armature winding, the motor series field winding, an adjustable lead connected to the resistor at any point of the sections of the second group thereof, and a lead from the junction between the generator series field winding and the second group of resistor sections to the generator armature; and means for driving the generator.

6. In a series drive, in combination, a series generator having an armature winding, a series field winding, and a magnetic circuit for the series field winding having a residual flux of not more than four percent of the no-load saturation flux of the generator and including an air gap of a given length; a series motor having an armature winding and a series field winding and a magnetic circuit having a residual flux of not more than four percent of the no-load saturation flux of the motor and including an air gap of a greater length than the air gap of the generator; a resistor comprising a plurality of sections, an adjustable lead connected to one junction of the resistor and disposed to shunt any number of one group of sections of the resistor, said generator series field winding being connected to both junctions of said resistor to thus form a first loop circuit; a second loop circuit, said second loop circuit including the generator armature winding, the motor armature winding, the motor series field winding, an adjustable lead connected to the resistor at any point of the second group of sections thereof, and a lead from the junction of the generator series field and the second group of resistor sections to the generator armature and means for driving the generator.

7. In a series drive, in combination, a series generator having an armature winding, a series field winding, a magnetic circuit for the series field winding having a residual flux of not more than four percent of the no-load saturation flux of the generator and including an air gap of a given length and a commutating field winding having a magnetic circuit of a magnetic capacity sufficiently high that it does not become saturated when high currents flow in the commutating field winding; a series motor having an armature winding and a series field winding and a magnetic circuit having a residual flux of not more than four percent of the no-load saturation flux of the motor and including an air gap of a greater length than the air gap of the generator; a resistor comprising a plurality of sections of two groups, an adjustable lead connected to one junction of the resistor and disposed to shunt any number of one group of sections of the resistor, said generator series field winding being connected to the junctions of said resistor to thus form a first loop circuit; a second loop circuit, said second loop circuit including the generator armature winding, the motor armature winding, the motor series field winding, an adjustable lead connected to the resistor at any point of the second group of sections thereof, and a lead from the junction of the generator series field and the second group of resistor sections to the generator armature winding; and means for driving the generator.

8. In a series drive, in combination, a series generator having an armature winding, and a series field winding; a series motor having an armature winding and a series field winding; a resistor comprising a plurality of sections, an adjustable lead connected to the resistor, a reactor having two coils, one coil being connected in series with the generator series field winding and the other coil being connected in series with said resistor, said generator series field winding and the reactor coil in series with it being connected across said resistor and other reactor coil to thus form a first loop circuit, a second loop circuit, said second loop circuit including the generator armature winding, the motor armature winding, the motor series field winding, the adjustable lead connected to the resistor, and the first loop circuit; and means for driving the generator.

WILLIAM R. HARDING.
SCOTT H. HANVILLE, Jr.